P. LEBOURG.
SIPHON LUBRICATOR.
APPLICATION FILED MAY 8, 1920.

1,360,418.

Patented Nov. 30, 1920.

Pierre Lebourg
INVENTOR

BY Victor J. Evans
ATTORNEY.

Alfred T. Bratton
WITNESS:

UNITED STATES PATENT OFFICE.

PIERRE LEBOURG, OF PHILADELPHIA, PENNSYLVANIA.

SIPHON-LUBRICATOR.

1,360,418. Specification of Letters Patent. Patented Nov. 30, 1920.

Application filed May 8, 1920. Serial No. 379,915.

*To all whom it may concern:*

Be it known that I, PIERRE LEBOURG, a citizen of the Republic of France, residing at Philadelphia, in the county of Philadelphia and State of Pennsylvania, have invented new and useful Improvements in Siphon-Lubricators, of which the following is a specification.

This invention relates to lubricators and more particularly to that form or type of lubricators which are termed siphon-feed oil cups and which serve in use to convey the lubricant to the moving part or bearing requiring constant lubrication.

Heretofore siphon-feed lubricators or oil cups have been more or less constant in their flow once the siphonic action has been set up with the result that much waste accrues in their application to moving parts of machinery or engines subject to constant or intermittent vibrations.

The main object of my invention is to provide a siphon-feed lubricator or oil cup in which the siphonic action for feeding purposes only takes place when the moving part or machine on which it is installed, is subjected to vibrations. In other words, the feeding of the lubricant only takes place during vibratory action on the lubricator or oil cup and when the latter is at rest said feeding action is automatically cut off.

Another object of this invention is to provide a siphon-feed lubricator or oil cup having a simple means for regulating the feed therefrom in such a manner that the quantity of said feed may be adapted to the particular service conditions required.

Still further the invention has for an object to provide a siphon-feed lubricator or oil cup which is simple in construction, easy to manufacture and not susceptible to any clogging action or waste of the lubricant when employed on machinery or engines subjected to varying and abnormal vibrations such as motor vehicles and the like.

With the foregoing principal objects in view and other minor ones which will be apparent as the description proceeds my invention consists essentially in the novel features of construction, combination and arrangement of parts hereinafter fully described and more specifically pointed out by the appended claims.

In the further disclosure of the invention reference is to be had to the accompanying sheet of drawings constituting a part of this specification and in which like characters of reference designate the same or similar parts in all the views.

Figure 1:
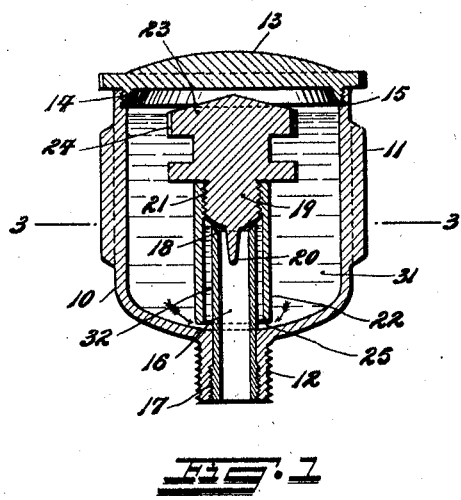
Figure 1 is a central vertical section through an oil cup or lubricator embodying my invention.
Figure 2:
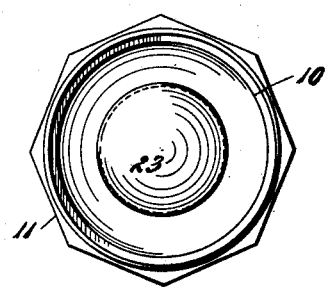
Fig. 2 is a plan view with the cap or cover removed.
Figure 3:
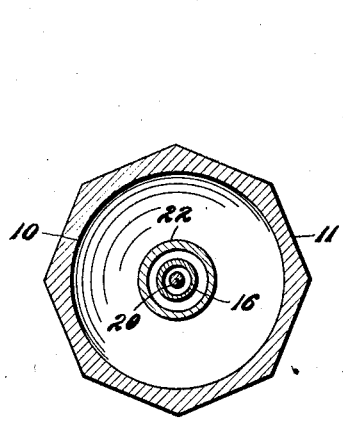
Fig. 3 is a horizontal section taken substantially on the line 3—3 in Fig. 1.
Figure 4:
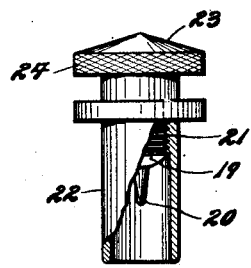
Fig. 4 is a detail view of the siphon producer removed from the oil cup or lubricator, parts being broken away and in section for the sake of clearness.
Figure 5:
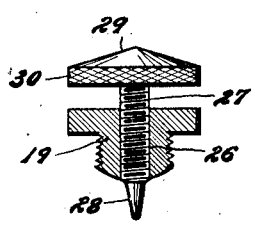
Fig. 5 is a sectional detail of a slightly modified form of the siphon-feed producer and regulator.

Referring to the drawings the numeral 10 designates a cylindrical cup or lubricant container which is formed polygonal exteriorly—octagonal for example—at 11 and provided with a threaded nipple 12 by means of which it is fixed in position. An air tight cup or cover 13 is provided with an annular depending threaded flange 14 which seats on a packing ring or washer 15 whereby the cup 10 is closed, air, dust and moisture proof.

Axially central of the cup or container 10 is an upstanding tubular member or conduit 16 which may be threaded at 17 into the nipple 12, or it may be formed integral therewith. The upper open end of the tubular member 16 is ground or otherwise formed to constitute a valve seat 18 for a valve 19 conveniently fashioned with a depending conical dropping nipple 20 and threaded at 21, to receive an outer tubular member 22 of larger diameter than the aforesaid conduit 16, and it is to be particularly noted that this outer tube 22 is of a length to extend downward almost into contact with the bottom of the cup 10. The upper conical part 23 of the valve 19 is preferably enlarged and milled at 24 for use in handling to adjust the degree of clearance at 25 for the purpose hereafter explained.

In some instances I may form the valve 19 with a threaded bore 26 adapted to receive a correspondingly threaded screw 27 on the lower end of which is formed a conical nipple 28 corresponding to the above referred to conical nipple 20, and at the upper end of said screw 27 is a conical head 29 peripherally serrated at 30 so that the projection of the nipple 28 may be regulated relative to the valve 19.

In use the cap or cover 13 is first removed and the siphon tube 22 and valve 19 adjusted to give the requisite degree of clearance at 25 whereupon the lubricant is filled in and the cap 13 replaced. Now it will be readily seen by reference to Fig. 1, that the filling of the cup 10 with lubricant 31 as indicated will cause the space 32 intervening between the inner and outer tubular members 16, 22, to be likewise filled, but that said lubricant can not flow past the valve 19 which seats on the top of the inner tube 16. Furthermore it will be also seen that when the parts are adjusted as shown, there is a clearance between the apex of the conical head 29 and the inner or under surface of the cap or cover 13. Now it will be readily understood that any vibration which tends to displace or lift the valve 19, will break the seal between the parts 19 and 18 whereupon the siphonic action will be set up due to the higher level of the lubricant in the cup 10 and said lubricant commences to pass the valve 19 and drop, globule by globule, from the nipple 20—or 28—down the conduit 16 to the part requiring lubrication. Cessation of the vibrations will automatically reseat the valve 19 by its own weight and gravity whereupon the feed is instantly cut off and flooding or waste entirely eliminated.

The above explained sequence of operations will continue so long as any lubricant 31 remains in the cup 10, even when the level thereof falls below the level in the space 32, and in fact experiments have shown that such action continues until the seal is broken at the clearance point 25, and is due to the viscosity of the lubricant.

From the foregoing it will be clearly apparent that by my invention I provide a lubricator which is siphonic in action or feed only when the inertia of the several parts is disturbed due to vibration, while the viscous nature of most lubricants insures a regular feed until the supply falls to the level of the clearance 25. Still further it will be easily comprehended that the quantity of the feed can be accurately adjusted by increasing or decreasing the amount of clearance at 25, while a proper drip is insured by the conical dropping nipple 20.

While I have described and shown a preferred embodiment of my invention I wish it clearly understood that I do not limit myself to the precise details of construction, combination and arrangement of parts disclosed but consider myself at liberty to make such other changes that may reasonably be construed as falling within the ambit and scope of the appended claims.

Having described my invention, what I claim as new and desire to secure by Letters Patent is:—

1. In a siphon-feed lubricator, the combination of a covered casing, an upstanding tube therein the upper part of which tube constitutes a valve seat, and a valve having a rockable portion opposed to the said valve seat and also having a tube surrounding and spaced from the first tube and extending downwardly to a point adjacent to the bottom of the casing; the said valve being spaced from the cover of the receptacle.

2. In a siphon-feed lubricator, the combination of a covered casing, an upstanding tube therein the upper part of which tube constitutes a valve seat, and a valve having a rockable portion opposed to the said valve seat and also having a tube surrounding and spaced from the first tube and extending downwardly to a point adjacent to the bottom of the casing; the said valve being spaced from the cover of the receptacle, and being provided with a dropping nipple disposed in and spaced from the upper portion of the first-named tube.

3. In a siphon-feed lubricator, the combination of a covered casing, an upstanding tube therein the upper part of which tube constitutes a valve seat, and a valve having a rockable portion opposed to the said valve seat and also having a tube surrounding and spaced from the first tube and extending downwardly to a point adjacent to the bottom of the casing; the said valve being spaced from the cover of the receptacle, and including a vertically adjacent portion having a dropping nipple pendent in and spaced from the upper portion of the first-named tube.

In testimony whereof I affix my signature.

PIERRE LEBOURG.